United States Patent [19]

Kita et al.

[11] Patent Number: 4,859,444
[45] Date of Patent: Aug. 22, 1989

[54] METHOD OF PRODUCING ULTRAFINE PARTICLES OF GRAPHITE FLUORIDE

[75] Inventors: Yasushi Kita; Shirou Moroi, both of Yamaguchi Prefecture, Japan

[73] Assignee: Central Glass Company, Limited, Ube, Japan

[21] Appl. No.: 160,775

[22] Filed: Feb. 26, 1988

[30] Foreign Application Priority Data

Feb. 27, 1987 [JP] Japan .................................. 62-42738

[51] Int. Cl.$^4$ ............................................ C01B 31/00
[52] U.S. Cl. .................................... 423/439; 423/489
[58] Field of Search ............................... 423/439, 489

[56] References Cited

U.S. PATENT DOCUMENTS 3,700,502 10/1972 Watanabe et al. ................... 429/218
4,036,786 7/1977 Tiedemann .......................... 423/439
4,440,617 4/1984 Solomon ............................. 429/42

FOREIGN PATENT DOCUMENTS 142113 5/1985 European Pat. Off. ............ 423/439

OTHER PUBLICATIONS

Kogyo II "Chem Abstracts", vol. 99, 1983, 214981p.

Primary Examiner—Jack Cooper
Attorney, Agent, or Firm—Fleit, Jacobson, Cohn, Price, Holman & Stern

[57] ABSTRACT

Graphite fluoride in the form of submicron particles is easily obtained at high yield by using, exclusively, acetylene black as the carbon material to be fluorinated with fluorine gas. Use of any other type of carbon black does not give comparable results. Graphite fluoride produced from acetylene black is superior in dispersibility.

1 Claim, No Drawings

METHOD OF PRODUCING ULTRAFINE PARTICLES OF GRAPHITE FLUORIDE

BACKGROUND OF THE INVENTION

This invention relates to a method of producing graphite fluoride in the form of ultrafine particles excellent in dispersibility by direct fluorination of carbon black.

Graphite fluoride is a common name of polycarbon fluorides represented by $(CF_x)_n$, wherein x is up to about 1.3. At present, most of graphite fluorides on the market are either $(CF)_n$ or $(C_2F)_n$. Graphite fluoride possesses distinctive properties including unusually low surface energy and has acquired importance as a widely applicable industrial material. For example, graphite fluoride is of use as lubricant, as water- and oil-repellent and also as an active material for cell electrodes.

Graphite fluoride is obtained by directly fluorinating a solid carbon material with fluorine gas usually diluted with an inactive gas. However, mainly for the following reasons, the gas-solid contact reaction to form a desired polycarbon fluoride is not easy to industrially carry out and must be carried out under deliberately chosen and strictly controlled conditions, which are considerably variable depending on the kind and physical form of the carbon material. The reaction between solid carbon and fluorine gas to form, for example, $(CF)_n$ or $(C_2F)_n$ is highly exothermic, and the formed polycarbon fluoride is liable to further react with fluorine gas to decompose into solid carbon and gaseous fluorocarbons such as $CF_4$ and $C_2F_6$. Such decomposition reaction is also exothermic. Besides, some side reactions are likely to take place between solid carbon and fluorine gas to form gaseous perfluorocarbons. As a matter of inconvenience, both the decomposition reaction and side reactions can proceed at temperatures near the temperature suitable for the intended reaction.

As to the starting material, a wide selection can be made from various forms of carbon such as natural or synthetic graphite, petroleum coke, pitch coke, carbon black, activated carbon and carbon fibers. In most cases coke or graphite is used by reason of relative ease of converting into graphite fluoride, and the fluorination reaction is carried out at 300°-500° C. Usually, graphite fluoride powders produced in this way are 1-50 μm in mean particle size.

Recently it is expanding to utilize excellent lubricity or water- and oil-repellency of graphite fluoride in composite materials comprising plastics, aqueous liquid or organic liquid as a principal component. For such applications, dispersibility of graphite fluoride becomes a very important factor. Since dispersibility of a powdery material depends greatly on the particle size, there is a keen demand for ultrafine particles, i.e. submicron particles, of graphite fluoride.

A conceivable way to obtain very fine particles of graphite fluoride is reducing the particle size of graphite fluoride powder obtained by the conventional synthesis process with a pulverizing machine. However, by this method it is very difficult and almost impracticable to obtain submicron particles of graphite fluoride. Even though the pulverizing operation is combined with classification operations, the ultimate particle is about 1 μm at best. Besides, this method entails considerable cost.

Another way is fluorinating a carbon material in the form of ultrafine particles. In this case consideration must be given to the fact that the particle size of the obtained graphite becomes more than twice the particle size of the starting carbon material by reason of intrusion of fluorine atoms between the carbon network layers. That is, the particle size of the starting material needs to be smaller than 0.5 μm for obtaining submicron particles of graphite fluoride. Therefore, the starting carbon material is limited to carbon black. However, it is not easy to industrially produce graphite fluoride from carbon black primarily because ultrafine particles of carbon black exhibit very high activity with fluorine and readily undergo the aforementioned side reactions to form gaseous perfluorocarbons. Accordingly the fluorination operation has to be performed with a countermeasure against the obstructive side reactions even though productivity of the operation is inevitably sacrificed. For example, JP-A 58-167414 proposes diluting 100 parts by weight of carbon black to be fluorinated with more than 50 parts by weight of graphite fluoride powder.

However, experiments have revealed that graphite fluoride carefully produced from carbon black does not greatly differ from ordinary graphite fluoride produced from petroleum coke in respect of dispersibility in water containing a surfactant or organic liquids such as alcohols and oils. Furthermore, even graphite fluoride produced from carbon black has a mean particle size larger than 1 μm when measured by a sedimentation method using correlation of particle size with settling velocity of particles well dispersed in a liquid.

In JP-A 61-218697, we have shown that graphite fluoride excellent in lubricity and improved in dispersibility is obtained by using, as the starting material, a graphitized carbon black having in its crystalline structure interlayer spacings of 3.38-3.55 Å determined by the X-ray diffraction (002). However, the particles of this graphite fluoride are not submicron when measured by a sedimentation method.

SUMMARY OF THE INVENTION

It is an object of the present invention to provide a method for easily and efficiently producing graphite fluoride in the form of ultrafine or submicron particles excellent in dispersibility.

To accomplish the above object the present invention provides a method of producing graphite fluoride, which belongs to direct fluorination of a carbon black with fluorine gas at an elevated temperature and is characterized in that acetylene black is used as said carbon black.

The method according to the invention, like known methods using carbon black as the starting material, provides graphite fluoride of the type represented by $(CF)_n$.

Graphite fluoride produced by the method of the invention is far smaller than 1 μm in mean particle size measured by a sedimentation method and exhibits excellent dispersibility in various dispersion media. This graphite fluoride is excellent also in lubricity and water- and oil-repellency. Furthermore, the fluorination reaction can easily be accomplished with very high yield of graphite fluoride with little formation of gaseous perfluorocarbons. We have confirmed that such advantages can be gained exclusively when acetylene black is used as the starting carbon material. Use of any other type of carbon black does not produce comparably good results.

Probably the advantages of the method according to the invention are attributed to uniqueness of acetylene black in both chemical composition and crystalline structure. Compared with other carbon blacks, acetylene black is significantly higher in the content of carbon and considerably lower in the contents of hydrogen and other volatile matter. As to physiochemical nature, it is distinctive of acetylene black that the primary particles are closely joining with each other to provide a well-developed chain structure. Furthermore, by virtue of its very high purity acetylene black has layers of well-developed hexagonal network with carbon atoms and, hence, is high in crystallinity. Needless to mention, acetylene black has a mean particle size far smaller than 1 μm.

DETAILED DESCRIPTION OF THE INVENTION

Carbon black is produced from hydrocarbons by incomplete combustion or by thermal decomposition. The incomplete combustion method is classified into four types, viz., gas furnace process to which natural gas is the principal feed, oil furnace process using heavy petroleum oils such as creosote oil and ethylene bottom oil, channel process using natural gas and lamp process using coal or heavy oils. The thermal decomposition method is classified into so-called thermal process decomposing natural gas and acetylene process employing exclusively acetylene as the feed. Currently, oil furnace black and gas furnace black, and particularly the former, constitute more than 90% of industrially produced carbon black, and it is not exaggeration to say that in practical sense "carbon black" refers to furnace black unless otherwise noted.

Mean particle sizes of available carbon blacks range from about 8 nm to about 500 nm. However, conversion of carbon black into graphite fluoride is accompanied by great enlargement of particle size as mentioned hereinbefore, and we have found that use of acetylene black is essential to the acquirement of graphite fluoride very excellent in dispersibility and smaller than 1000 nm in mean particle size measured by a sedimentation method.

For example, in the case of producing graphite fluoride from a furnace black the yield of the fluorination reaction is not good, and, even though the primary particles of the employed furnace black are smaller than 50 nm, the obtained graphite fluoride is larger than 1000 nm in mean particle size measured by a sedimentation method and in this regard does not distinctly differ from graphite fluoride produced from petroleum coke. Presumably this is because of very strong cohesion of the graphite fluoride particles. The channel process can provide carbon black smaller in particle size than furnace blacks, but this process suffers from very low yield and high cost and is not likely to stably supply carbon black of a given quality on an industrial scale. Lamp black is highly active to fluorine, and experiments have revealed impracticability of stably producing graphite fluoride from lamp black. Thermal black is relatively large (larger than 100 nm) in the size of primary particles and has proved inferior to acetylene black as a carbon material for producing graphite fluoride.

As a fluorinating gas in the method according to the invention, it is suitable to employ a mixture of not more than 30% by volume of fluorine gas and the balance of an inactive gas such as argon or nitrogen is suitable. When the concentration of fluorine in the employed gas is more than 30% the rate of the reaction between carbon (acetylene black) and fluorine becomes too high, and the side reactions to form perfluorocarbons and/or decomposition of the formed graphite fluoride into carbon and perfluorocarbons are likely to take place. It is preferred to use a mixed gas containing not more than 20% by volume of fluorine gas.

It is suitable to carry out the fluorination reaction at temperatures in the range from 320° to 400° C. When the reaction temperature is below 320° C. the rate of reaction is very low so that a very long time is needed to practically complete the reaction. When the reaction temperature is above 400° C. the rate of reaction becomes too high, and the adverse influence of the aforementioned decomposition and side reactions on the yield of graphite fluoride augments.

EXAMPLE

A commercial acetylene black (supplied from Denki Kagaku Kogyo Co., Ltd.) having a mean particle size (primary particles) of 42 nm was used as the starting material. According to the specifications this acetylene black was as high as 99.8% in carbon content and as low as 0.4% in hydrogen content. By powder X-ray diffractometry with Cu-$K_\alpha$ line using silicon as standard, the acetylene black had interlayer spacings $d_{002}$ of 3.53 Å.

To synthesize graphite fluoride, 10 g of the acetylene black was charged in a reactor made of nickel, and the atmosphere in the apparatus was replaced by a mixed gas consisting of 20 vol% of fluorine and 80 vol% of argon. At room temperature the mixed gas pressure in the apparatus was regulated to the atmospheric pressure. After that the mixed gas was continuously passed through the reactor at a flow rate of 100 ml/min, while the temperature in the reactor was gradually raised at a rate of 5° C./min until the temperature reached 380° C. Thereafter the feed of the mixed gas was continued for 30 hr while the temperature was maintained at 380° C. to thereby accomplish fluorination of the acetylene black to $(CF)_n$.

The weight of the obtained graphite fluoride, $W_p$, and the content of fluorine, $C_F$ (%), were measured to calculate the yield of the graphite fluoride on the basis of the weight of the starting carbon material, $W_c$, by the following equation:

$$\text{yield (\%)} = \frac{W_p (g) \times (1 - C_F/100)}{W_c (g)} \times 100$$

The yield was 99%.

As to mean particle size of the obtained graphite fluoride, a particle size distribution analyzer of the centrifugal sedimentation type was used for measurement in view of the fact that dispersibility of the analyzed powder too is reflected in the result of this analysis. Ethyl alcohol was employed as the liquid medium. As the result, the graphite fluoride had a mean particle size of 380 nm.

As Comparative Examples 1 to 3, two kinds of furnace blacks and a graphitized carbon black were respectively fluorinated by the same method as in the foregoing Example except that the fluorinating reaction temperature was varied as shown in Table 1. The graphitized carbon black was obtained by heat treatment (above 2000° C.) of a furnace black. The interlayer spacings $d_{002}$ and mean particle size of each carbon black were as shown in Table 1. In Comparative Examples 1-3, the yield and mean particle size of each product were determined by the same methods as in Example. The results are shown in Table 1.

TABLE 1

| Carbon Black | | | | | | Graphite Fluoride | |
|---|---|---|---|---|---|---|---|
| | | Mean Particle | Fluorination Conditions | | | | Mean Particle |
| Kind | $d_{002}$ (Å) | Size(*) (nm) | Temp. (°C.) | Time (hr) | Yield (%) | | Size (nm) |
| acetylene black (Example) | 3.53 | 42 | 380 | 30 | 99 | | 380 |
| furnace black (Comp. Ex. 1) | 3.60 | 30 | 260 | 30 | 75 | | 2950 |
| furnace black (Comp. Ex. 2) | 3.58 | 40 | 260 | 30 | 78 | | 3200 |
| graphitized carbon black (Comp. Ex. 3) | 3.44 | 94 | 420 | 30 | 99 | | 1050 |

(*)primary particles

As can be seen clearly in the Table, when acetylene black was used as the starting carbon material graphite fluoride was obtained at very high yield, and the particle size of the obtained graphite fluoride was remarkably small. In contrast, the graphite fluorides produced from furnace blacks were very larger in particle size though the primary particles of the furnace blacks were fairly small.

Furthermore, dispersibilities of the graphite fluorides obtained in the above Example and Comparative Examples were examined by the following test method.

First, 1 g of the graphite fluoride for testing was added to 99 g of an organic liquid, which was alternatively selected from ethanol, acetone and butyl ether, and was dispersed in the liquid by an ultrasonic agitation method. The resultant dispersion was put into a 100 ml test tube (25 mm in inner diameter and 250 mm in length) and was left standing. As the graphite fluoride particles slowly settled an upper layer of the liquid in the test tube gradually became clear and almost transparent. The vertical distance between the liquid surface in the test tube and the interface between the clear liquid layer and the lower layer in which graphite fluoride particles were still dispersed slowly increased as time elapsed. The measurements were as shown in Tables 2 to 4, wherein "settling level" refers to the aforementioned interface.

The results of this test are clearly indicative of superiority in dispersibility of the graphite fluoride produced from acetylene black.

TABLE 2

| | Settling in Ethanol | | | | |
|---|---|---|---|---|---|
| | Distance of Settling Level from Liquid Surface (mm) | | | | |
| Graphite Fluoride | Elapsed Time (days) | | | | |
| | 1 | 2 | 4 | 8 | 20 |
| Example | — | — | 2 | 9 | 20 |
| Comp. Ex. 1 | 4 | 11 | 21 | 44 | >100 |
| Comp. Ex. 2 | 4 | 11 | 22 | 50 | >100 |
| Comp. Ex. 3 | 1 | 3 | 7 | 18 | 45 |

TABLE 3

| | Settling in Acetone | | | | |
|---|---|---|---|---|---|
| | Distance of Settling Level from Liquid Surface (mm) | | | | |
| Graphite Fluoride | Elapsed Time (days) | | | | |
| | 1 | 2 | 4 | 8 | 20 |
| Example | 3 | 6 | 12 | 24 | 60 |
| Comp. Ex. 1 | 25 | 40 | 70 | >100 | |
| Comp. Ex. 2 | 30 | 42 | 75 | >100 | |
| Comp. Ex. 3 | 10 | 16 | 30 | 58 | >100 |

TABLE 4

| | Settling in Butyl Ether | | | | |
|---|---|---|---|---|---|
| | Distance of Settling Level from Liquid Surface (mm) | | | | |
| Graphite Fluoride | Elapsed Time (days) | | | | |
| | 1 | 2 | 4 | 8 | 20 |
| Example | — | — | 1 | 4 | 20 |
| Comp. Ex. 1 | 2 | 6 | 15 | 28 | >100 |
| Comp. Ex. 2 | 2 | 9 | 17 | 30 | >100 |
| Comp. Ex. 3 | — | 2 | 5 | 12 | 50 |

What is claimed is:

1. A method of producing a graphite fluoride of the formula $(CF)_n$ in the form of submicron particles, the method comprising fluorinating acetylene black with a fluorinating gas consisting of not more than 30 vol % of fluorine gas and the balance of an inactive gas at a temperature in the range from 320° to 400° C.

* * * * *